United States Patent
Zhang et al.

(10) Patent No.: US 10,809,709 B2
(45) Date of Patent: Oct. 20, 2020

(54) INFORMATION STORAGE SYSTEM AND APPARATUS

(71) Applicant: Huawei Technologies Co., Ltd., Shenzhen (CN)

(72) Inventors: Mingming Zhang, Shanghai (CN); Jianfeng Zheng, Shanghai (CN); Chengwang Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 288 days.

(21) Appl. No.: 15/991,813

(22) Filed: May 29, 2018

(65) Prior Publication Data

US 2018/0275646 A1    Sep. 27, 2018

Related U.S. Application Data

(63) Continuation of application No. PCT/CN2016/102459, filed on Oct. 18, 2016.

(30) Foreign Application Priority Data

May 24, 2016  (CN) .......................... 2016 1 0348294

(51) Int. Cl.
*G05B 23/02* (2006.01)
*G05B 19/042* (2006.01)

(52) U.S. Cl.
CPC ....... *G05B 23/0264* (2013.01); *G05B 19/042* (2013.01); *G05B 23/021* (2013.01);
(Continued)

(58) Field of Classification Search
CPC .............. G05B 23/0264; G05B 19/042; G05B 23/0267; G05B 2219/2637;
(Continued)

(56) References Cited

U.S. PATENT DOCUMENTS

| 5,491,631 A | 2/1996 | Shirane et al. |
| 6,212,449 B1 * | 4/2001 | Wellman .............. G01R 31/007 701/31.8 |

(Continued)

FOREIGN PATENT DOCUMENTS

| CN | 201600595 U | 10/2010 |
| CN | 103105846 A | 5/2013 |

(Continued)

OTHER PUBLICATIONS

Machine Translation and Abstract of German Publication No. DE102013200249, Jul. 18, 2013, 13 pages.

(Continued)

*Primary Examiner* — Russell Frejd
(74) *Attorney, Agent, or Firm* — Conley Rose, P.C.

(57) ABSTRACT

An information storage system and apparatus relate to the field of automatic control technologies in order to resolve a problem that there is little information for diagnosing a fault that is stored using a freeze frame. The system includes at least one subcontroller configured to obtain a parameter value corresponding to a parameter, and send the parameter and the parameter value corresponding to the parameter to a management controller, the management controller configured to send the received parameter and the received parameter value corresponding to the parameter to a vehicle-intelligent device, and the vehicle-intelligent device is configured to receive and store the parameter and the parameter value corresponding to the parameter, where each subcontroller is coupled to at least one executor, and the management controller is coupled to each subcontroller of the at least one subcontroller.

20 Claims, 2 Drawing Sheets

(52) U.S. Cl.
CPC .............. *G05B 23/0267* (2013.01); *G05B 2219/24033* (2013.01); *G05B 2219/24065* (2013.01); *G05B 2219/24085* (2013.01); *G05B 2219/2637* (2013.01)

(58) Field of Classification Search
CPC ........... G05B 2219/24033; G05B 2219/24085; G05B 23/021; G05B 2219/24065
See application file for complete search history.

(56) References Cited

U.S. PATENT DOCUMENTS

| | | | |
|---|---|---|---|
| 9,165,413 | B2 | 10/2015 | Jones et al. |
| 2007/0113692 | A1* | 5/2007 | Yasukawa .............. B41J 29/38 73/865.9 |
| 2011/0022891 | A1* | 1/2011 | Fijany ................ G06F 11/3608 714/26 |
| 2011/0313616 | A1 | 12/2011 | Tsuchikiri et al. |
| 2013/0030641 | A1 | 1/2013 | Olsen, III et al. |
| 2013/0124032 | A1 | 5/2013 | Singh et al. |
| 2013/0184929 | A1* | 7/2013 | Salman .............. G05B 23/0283 701/31.5 |
| 2014/0358357 | A1 | 12/2014 | Jones et al. |
| 2016/0163135 | A1 | 6/2016 | Olsen, III et al. |

FOREIGN PATENT DOCUMENTS

| | | |
|---|---|---|
| CN | 103207087 A | 7/2013 |
| CN | 103718218 A | 4/2014 |
| CN | 103777626 A | 5/2014 |
| DE | 102013200249 A1 | 7/2013 |
| JP | 2010137644 A | 6/2010 |
| WO | 2015084237 A1 | 6/2015 |

OTHER PUBLICATIONS

Foreign Communication From a Counterpart Application, European Application No. 16902936.0, Partial Supplementary European Search Report dated Oct. 30, 2018, 11 pages.
Machine Translation and Abstract of Chinese Publication No. CN103777626, May 7, 2014, 16 pages.
Machine Translation and Abstract of Chinese Publication No. CN201600595, Oct. 6, 2010, 11 pages.
Foreign Communication From a Counterpart Application, PCT Application No. PCT/CN2016/102459, English Translation of International Search Report dated Feb. 28, 2017, 2 pages.
Foreign Communication From a Counterpart Application, European Application No. 16902936.0, Extended European Search Report dated Feb. 7, 2019, 12 pages.
Foreign Communication From a Counterpart Application, Chinese Application No. 201610348294.6, Chinese Office Action dated Mar. 25, 2019, 9 pages.

* cited by examiner

INFORMATION STORAGE SYSTEM AND APPARATUS

CROSS-REFERENCE TO RELATED APPLICATIONS

This application is a continuation of International Patent Application No. PCT/CN2016/102459 filed on Oct. 18, 2016, which claims priority to Chinese Patent Application No. 201610348294.6 filed on May 24, 2016. The disclosures of the aforementioned applications are hereby incorporated by reference in their entireties.

TECHNICAL FIELD

The present disclosure relates to the field of automatic control technologies, and in particular, to an information storage system and apparatus.

BACKGROUND

With increasingly complex automobile functions and rapid development of network technologies, communications technologies, and electronic technologies, automotive electronization degree becomes higher, automobile fault diagnosis also becomes more complex, and a conventional automobile fault record and storage manner cannot satisfy increasing application requirements. The automobile fault diagnosis refers to detection, analysis, and determining that are performed to determine an automobile technical status or find a fault part and a fault reason without disassembly (or by only disassembling several small parts) if the automobile has a hidden fault danger, the technical status is bad, or the automobile has partially or totally lose a working capability.

There are two basic methods for diagnosing an automobile fault. One is an artificial diagnosis method, and the other is an instrument device diagnosis method. The artificial diagnosis is mainly based on practice experience and knowledge of a person performing diagnosis, and the person uses simple tools and sensory means such as watching with eyes, listening with ears, and touching with hands to perform checking, testing, and analyzing in order to determine the automobile technical status. The instrument device diagnosis method is to detect, using a universal or dedicated instrument device, information stored in the automobile for diagnosing a fault in order to determine an automobile status. The instrument device diagnosis method is extremely based on the stored information used for diagnosing a fault.

In other approaches, the information used for diagnosing a fault is generally stored using a freeze frame. Such a storage manner can store only little and incomprehensive data information, and cannot satisfy increasing application requirements.

SUMMARY

The present disclosure provides an information storage system and apparatus in order to resolve a problem that there is little information that is used for diagnosing a fault and that is stored using a freeze frame.

According to a first aspect, an information storage system is provided, including a management controller, a vehicle-intelligent unit, and at least one subcontroller, where each subcontroller of the at least one subcontroller is connected to at least one executor, and the management controller is connected to each subcontroller of the at least one subcontroller, the subcontroller is configured to determine a fault number of the fault and send the fault number to the management controller when detecting that a fault occurs in the executor connected to the subcontroller, the management controller is configured to search for a parameter corresponding to the fault number and feed back the found parameter to the subcontroller sending the fault number when receiving the fault number sent by the subcontroller, where the parameter is a parameter used to diagnose a fault cause, the subcontroller is configured to obtain a parameter value corresponding to the parameter, and send the parameter and the parameter value corresponding to the parameter to the management controller when receiving the parameter that is fed back by the management controller and that corresponds to the fault number, the management controller is configured to send the fault number, the parameter, and the parameter value corresponding to the parameter to the vehicle-intelligent unit when receiving the parameter and the parameter value corresponding to the parameter that are sent by the subcontroller, and the vehicle-intelligent unit is configured to store the fault number, the parameter, and the parameter value corresponding to the parameter when receiving the fault number, the parameter, and the parameter value corresponding to the parameter that are sent by the management controller.

Based on the first aspect, optionally, when detecting that a fault occurs in the executor connected to the subcontroller, the subcontroller latches an operating parameter and a parameter value corresponding to the operating parameter, and obtains, from the latched operating parameter and the latched parameter value corresponding to the operating parameter, a parameter value corresponding to a target parameter, where the target parameter refers to the received parameter that is fed back by the management controller and that corresponds to the fault number, when receiving the parameter and the parameter value corresponding to the parameter that are sent by the subcontroller, the management controller sends a latch deletion command to the subcontroller, and when receiving the latch deletion command sent by the management controller, the subcontroller deletes, according to the latch deletion command, the operating parameter and the parameter value corresponding to the operating parameter.

Based on the first aspect, optionally, when receiving the parameter and the parameter value corresponding to the parameter that are sent by the subcontroller, the management controller determines a relative time at which the fault occurs, and send the relative time to the vehicle-intelligent unit, when receiving the relative time sent by the management controller, the vehicle-intelligent unit determines, according to the relative time, an absolute time at which the fault occurs, and store the relative time at which the fault occurs and the absolute time at which the fault occurs.

Based on the first aspect, optionally, the vehicle-intelligent unit determines location information and environment information when the fault occurs, and stores the location information and the environment information when the fault occurs.

Based on the first aspect, optionally, the system further includes a remote server or a client, where the vehicle-intelligent unit sends, to the remote server or the client, the fault number, the parameter, the parameter value corresponding to the parameter, the relative time at which the fault occurs, the absolute time at which the fault occurs, and the location information and the environment information when the fault occurs, and when receiving the fault number, the parameter, the parameter value corresponding to the parameter, the relative time at which the fault occurs, the absolute time at which the fault occurs, and the location information and the environment information when the fault occurs, the remote server or the client stores the fault number, the parameter, the parameter value corresponding to the parameter, the relative time at which the fault occurs, the absolute time at which the fault occurs, and the location information and the environment information when the fault occurs.

Based on the first aspect, optionally, the vehicle-intelligent unit sends a time synchronization flag bit to the management controller, and when receiving the time synchronization flag bit, the management controller adjusts the relative time according to the time synchronization flag bit.

Based on the first aspect, optionally, when detecting that a fault occurs in the executor connected to the subcontroller, the subcontroller sets a fault flag bit of the executor to a first state, where the first state is used to indicate that a fault occurs in the executor, and sends, to the management controller, the fault flag bit that is set to the first state, and when receiving the fault flag bit that is set to the first state, the management controller determines that the fault flag bit is set to the first state.

Based on the first aspect, optionally, when detecting that the fault of the executor connected to the subcontroller is repaired, the subcontroller sets the fault flag bit to a second state, where the second state is used to indicate that the fault of the executor is already repaired, and sends, to the management controller, the fault flag bit that is set to the second state, when receiving the fault flag bit that is set to the second state, the management controller determines a relative time at which the fault is repaired, and sends, to the vehicle-intelligent unit, the relative time at which the fault is repaired, the fault number, and the fault flag bit that is set to the second state, when receiving the relative time at which the fault is repaired, the fault number, and the fault flag bit that is set to the second state, the vehicle-intelligent unit determines, according to the relative time at which the fault is repaired, an absolute time at which the fault is repaired, stores the relative time at which the fault is repaired, the absolute time at which the fault is repaired, the fault number, and the fault flag bit that is set to the second state, and sends, to the remote server or the client, the relative time at which the fault is repaired, the absolute time at which the fault is repaired, the fault number, and the fault flag bit that is set to the second state, and when receiving the relative time at which the fault is repaired, the absolute time at which the fault is repaired, the fault number, and the fault flag bit that is set to the second state, the remote server or the client stores the relative time at which the fault is repaired, the absolute time at which the fault is repaired, the fault number, and the fault flag bit that is set to the second state.

Based on the first aspect, optionally, when detecting that communication between the management controller and the subcontroller is interrupted, the management controller determines information about the communication interruption and a relative time at which the communication is interrupted, and sends the information about the communication interruption and the relative time at which the communication is interrupted to the vehicle-intelligent unit, when receiving the information about the communication interruption and the relative time at which the communication is interrupted, the vehicle-intelligent unit determines, according to the relative time at which the communication is interrupted, an absolute time at which the communication is interrupted, stores the information about the communication interruption, the relative time at which the communication is interrupted, and the absolute time at which the communication is interrupted, and sends the information about the communication interruption, the relative time at which the communication is interrupted, and the absolute time at which the communication is interrupted to the remote server or the client, and when receiving the information about the communication interruption, the relative time at which the communication is interrupted, and the absolute time at which the communication is interrupted, the remote server or the client stores the information about the communication interruption and the relative time at which the communication is interrupted and the absolute time at which the communication is interrupted.

According to a second aspect, an information storage apparatus is provided, including a processing unit and a detection unit, where the detection unit is configured to detect whether a fault occurs in a node connected to the detection unit, and the processing unit is configured to determine a fault number of the fault when the detection unit detects that a fault occurs in the node connected to the detection unit, determine a parameter corresponding to the fault number, where the parameter is a parameter for diagnosing a fault cause, obtain a parameter value corresponding to the parameter, and store the fault number, the parameter, and the parameter value corresponding to the parameter in preset storage space.

Based on the second aspect, optionally, when the detection unit detects that a fault occurs in the node connected to the detection unit, the processing unit buffers an operating parameter of a machine to which the node connected to the detection unit belongs, and a parameter value corresponding to the operating parameter, and obtains, from the buffered operating parameter and the buffered parameter value corresponding to the operating parameter, a parameter value corresponding to a target parameter, where the target parameter refers to a parameter that is determined by the processing unit and that corresponds to the fault number.

Based on the second aspect, optionally, after obtaining the parameter value corresponding to the parameter, the processing unit deletes the buffered operating parameter and the buffered parameter value corresponding to the operating parameter.

Based on the second aspect, optionally, after determining that a communication fault occurs in a node connected to the processing unit, the processing unit obtains information about a time at which the communication fault occurs, and stores, in preset storage space, information that a communication fault occurs between the node connected to the processing unit and the processing unit, and the information about the time at which the communication fault occurs.

Based on the second aspect, optionally, when the detection unit detects that a fault occurs in the node connected to the detection unit, the processing unit sets a fault flag bit of the node connected to the detection unit to a first state, where the first state is used to indicate that a fault occurs in the node connected to the detection unit, and stores the fault flag bit that is set to the first state in the preset storage space.

Based on the second aspect, optionally, after the detection unit detects that the fault of the node connected to the detection unit is repaired, the processing unit sets the fault flag bit of the node connected to the detection unit to a second state, where the second state is used to indicate that the fault of the node connected to the detection unit is already repaired, and stores the fault flag bit that is set to the second state in the preset storage space.

Based on the second aspect, optionally, when the detection unit detects that a fault occurs in the node connected to the detection unit, the processing unit obtains time information, location information, and environment information when a fault occurs in the node connected to the detection unit, and stores the time information, the location information, and the environment information in the preset storage space.

Based on the second aspect, optionally, when the detection unit detects that a fault occurs in the node connected to the detection unit, the processing unit notifies a node, used to obtain the time information, the location information, and the environment information to obtain and store the time information, the location information, and the environment information.

Based on the second aspect, optionally, the apparatus further includes a transceiver unit, where the transceiver unit sends, to a remote server or a client, the fault number, the parameter, the parameter value corresponding to the parameter, and the time information, the location information, and the environment information when the fault occurs.

According to a third aspect, an information storage method is provided, including determining, by the first node, a fault number of the fault when detecting that a fault occurs in a second node connected to a first node, determining a parameter corresponding to the fault number, where the parameter is a parameter for diagnosing a fault cause, obtaining a parameter value corresponding to the parameter, and storing the fault number, the parameter, and the parameter value corresponding to the parameter in preset storage space.

Based on the third aspect, optionally, when detecting that a fault occurs in the second node, the first node buffers an operating parameter of a machine to which the second node belongs, and a parameter value corresponding to the operating parameter, and obtains, from the buffered operating parameter and the buffered parameter value corresponding to the operating parameter, a parameter value corresponding to a target parameter, where the target parameter refers to a parameter that is determined by the first node and that corresponds to the fault number.

Based on the third aspect, optionally, after obtaining the parameter value corresponding to the parameter, the first node deletes the buffered operating parameter and the buffered parameter value corresponding to the operating parameter.

Based on the third aspect, optionally, after determining that a communication fault occurs in a third node connected to the first node, the first node obtains information about a time at which the communication fault occurs, and stores, in preset storage space, information that a communication fault occurs between the first node and the third node and the information about the time at which the communication fault occurs.

Based on the third aspect, optionally, when detecting that a fault occurs in the second node, the first node sets a fault flag bit of the second node to a first state, and stores the fault flag bit that is set to the first state in the preset storage space, where the first state is used to indicate that a fault occurs in the second node.

Based on the third aspect, optionally, after detecting that the fault of the second node is repaired, the first node sets the fault flag bit of the second node to a second state, and stores the fault flag bit that is set to the second state in the preset storage space, where the second state is used to indicate that the fault is already repaired.

Based on the third aspect, optionally, when detecting that a fault occurs in the second node, the first node obtains time information, location information, and environment information when a fault occurs in the second node, and stores, in the preset storage space, and the time information, the location information, and the environment information when the fault occurs in the second node.

Based on the third aspect, optionally, when detecting that a fault occurs in the second node, the first node notifies a target node to obtain and store the time information, the location information, and the environment information when the fault occurs, where the target node is a node used to obtain the time information, the location information, and the environment information.

Based on the third aspect, optionally, the first node sends, to the remote server or the client, the fault number, the parameter, the parameter value corresponding to the parameter, and the time information, the location information, and the environment information when the fault occurs.

In the embodiments of the present disclosure, when a fault is detected, a parameter corresponding to the fault and a parameter value corresponding to the parameter can be stored, and for the parameter, a parameter type and a parameter quantity are not limited. Therefore, compared with the other approaches in which information used for diagnosing a fault cause is stored using a freeze frame, relatively comprehensive information can be stored.

DESCRIPTION OF EMBODIMENTS

To make the objectives, technical solutions, and advantages of the present disclosure clearer, the following further describes the present disclosure in detail with reference to the accompanying drawings.

Figure 1:
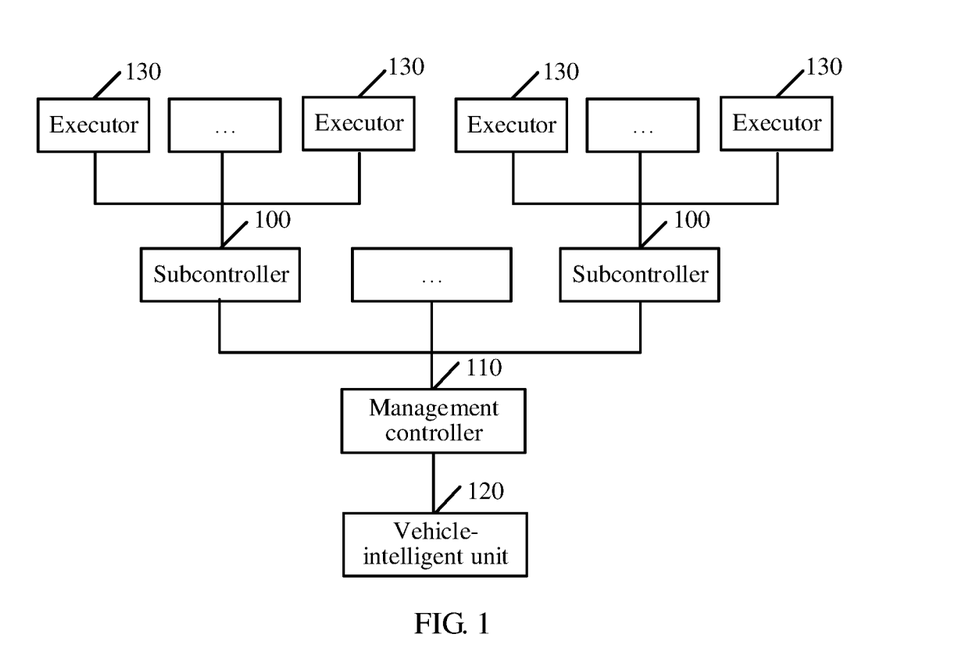
FIG. 1 is a schematic structural diagram of an information storage system according to an embodiment of the present disclosure.

As shown in FIG. 1, an information storage system in this embodiment of the present disclosure includes a management controller 110, a vehicle-intelligent unit 120, and at least one subcontroller 100, where each subcontroller 100 in the at least one subcontroller 100 is connected to at least one executor 130, and the management controller 110 is connected to each subcontroller 100, the subcontroller 100 is configured to determine a fault number of the fault and send the fault number to the management controller 110 when detecting that a fault occurs in the executor 130 connected to the subcontroller 100, the management controller 110 is configured to search for a parameter corresponding to the fault number when receiving the fault number sent by the subcontroller 100 and feedback the found parameter to the subcontroller 100 sending the fault number, where the parameter is a parameter used to diagnose a fault cause, the subcontroller 100 is configured to obtain a parameter value corresponding to the parameter, and send the parameter and the parameter value corresponding to the parameter to the management controller 110 when receiving the parameter that is fed back by the management controller 110 and that corresponds to the fault number, the management controller 110 is configured to send the fault number, the parameter, and the parameter value corresponding to the parameter to the vehicle-intelligent unit 120 when receiving the parameter and the parameter value corresponding to the parameter that are sent by the subcontroller 100, the vehicle-intelligent unit 120 is configured to store the fault number, the parameter, and the parameter value corresponding to the parameter when receiving the fault number, the parameter, and the parameter value corresponding to the parameter that are sent by the management controller 110.

It should be understood that the storage system in this embodiment of the present disclosure may be applied in a machine such as an automobile. Using an automobile as an example, the executor in this embodiment of the present disclosure may be a car light or an engine.

It should be noted that a quantity of parameters in this embodiment of the present disclosure is not limited to one, and may be multiple. Further, the quantity of parameters that need to be obtained, and specific parameters may be set according to requirements of a user.

Each subcontroller is connected to at least one executor, that is, each subcontroller can control at least one executor. For example, the information storage system includes a subcontroller 1, a subcontroller 2, and a subcontroller 3. The subcontroller 1 controls a car light, the subcontroller 2 controls an engine, and the subcontroller 3 controls a steering wheel and a horn. When the information storage system includes only one subcontroller, the subcontroller controls all the executors.

It should be understood that the parameter in this embodiment of the present disclosure may be preset in memory space of the management controller 110. Further, the parameter may be stored in a list form or in another form.

It should be understood that in this embodiment of the present disclosure, when the information storage system is applied to an automobile, the fault number may be a diagnostic trouble code (DTC), or may be a predefined fault number.

Further, parameters in this embodiment of the present disclosure include an external parameter that can cause the executor 130 to encounter a fault, an original parameter of running of the executor 130, an intermediate parameter, and an output parameter. For example, when the executor 130 is a car light, the parameters may include an input voltage of the car light, a temperature of the car light, and an intermediate parameter before the temperature of the car light is obtained through calculation.

In this embodiment of the present disclosure, the parameters may be artificially increased or reduced according to requirements. This avoids a disadvantage in the other approaches that information stored using a freeze frame is little and cannot be modified according to requirements.

It should be noted that in this embodiment of the present disclosure, the parameters may be separately stored in a corresponding subcontroller 100 such that when the subcontroller 100 detects that a fault occurs in the executor 130, parameters corresponding to the fault numbers are directly obtained.

When receiving the fault number, the parameter, and the parameter value corresponding to the parameter that are sent by the management controller 110, after storing the fault number, the parameter, and the parameter value corresponding to the parameter in preset storage space, the vehicle-intelligent unit 120 may further send the fault number, the parameter, and the parameter value corresponding to the parameter to a remote server or a client. When receiving the fault number, the parameter, and the parameter value corresponding to the parameter, the remote server or the client stores the fault number, the parameter, and the parameter value corresponding to the parameter.

It should be noted that the vehicle-intelligent unit 120 may store the fault number, the parameter, and the parameter value corresponding to the parameter in a list form. When the fault number is 1, the parameters include a parameter 1, a parameter 2, and a parameter 3, a value corresponding to the parameter 1 is a parameter value 1, a value corresponding to the parameter 2 is a parameter value 2, and a value corresponding to the parameter 3 is a parameter value 3, as shown in Table 1.

TABLE 1

| Fault number | Parameter 1 | Parameter 2 | Parameter 3 |
| --- | --- | --- | --- |
| 1 | Parameter value 1 | Parameter value 2 | Parameter value 3 |

The preset storage space may be memory space of the vehicle-intelligent unit 120, or may be an external storage device connected to the vehicle-intelligent unit 120.

To simplify obtaining of the parameter value corresponding to the parameter, optionally, when detecting that a fault occurs in the executor 130 connected to the subcontroller 100, the subcontroller 100 latches an operating parameter and a parameter value corresponding to the operating parameter, then obtains, from the latched operating parameter and the parameter value corresponding to the operating parameter, a parameter value corresponding to a target parameter after receiving the parameter that is fed back by the management controller and that corresponds to the fault number, and sends the parameter and the parameter value corresponding to the parameter to the management controller 110. The target parameter refers to a parameter that is fed back by the management controller 110 and that corresponds to the fault number.

Because latch space of the subcontroller 100 is relatively small to enable the subcontroller 100 to successfully implement latching, after receiving the parameter and the parameter value corresponding to the parameter, the management controller 110 sends a latch deletion command to the subcontroller 100 sending the parameter and the parameter value corresponding to the parameter. When receiving the latch deletion command sent by the management controller 110, the subcontroller 100 deletes the latched operating parameter and the latched parameter value corresponding to the operating parameter.

To locate or restore, according to stored information, data of a field in which a fault occurs, or to search for information that is used to diagnose a fault and that is stored several months ago or several years ago, optionally, when receiving the parameter and the parameter value corresponding to the parameter that are sent by the subcontroller 100, the management controller 110 determines a relative time at which the fault occurs, and sends the relative time to the vehicle-intelligent unit 120, when receiving the relative time sent by the management controller 110, the vehicle-intelligent unit 120 determines, according to the relative time, an absolute time at which the fault occurs, and stores the relative time at which the fault occurs and the absolute time at which the fault occurs.

To ensure accuracy of the absolute time that is determined by the vehicle-intelligent unit 120 according to the relative time sent by the management controller 110, the vehicle-intelligent unit 120 sends a time synchronization flag bit to the management controller 110. After receiving the time synchronization flag bit, the management controller 110 adjusts the relative time according to the time synchronization flag bit.

Further, in an optional implementation manner, after receiving the time synchronization flag bit, the management controller 110 sets the relative time to 00:00. If the current absolute time is 13:00, the relative time 00:00 corresponds to the absolute time 13:00, and when the relative time is 01:00, a corresponding absolute time is 14:00. After receiving the time synchronization flag bit, the management controller 110 sets the relative time to 00:00. If the current absolute time is 12:00, the relative time 01:00 corresponds to the absolute time 13:00.

In this embodiment of the present disclosure, the management controller 110 may further directly adjust a relative time to an absolute time through artificial setting.

For example, the vehicle-intelligent unit 120 further determines location information and environment information when a fault occurs, and stores the location information and the environment information when the fault occurs.

It should be noted that the location information is the location information when the fault occurs, for example, a name of a road, the longitude and the latitude, or other information that can be used to determine a location. The environment information includes, but is not limited to, a temperature and humidity when the fault occurs, an altitude of the location, a weather condition (for example, it is sunny, rainy, or snowy), and road condition information (such as a congestion situation, a super highway, a country lane, or a road in a mountainous area).

Further, a manner for storing the fault number, the parameter, the parameter value corresponding to the parameter, the relative time, the absolute time, the location information, and the environment information is shown in Table 2.

the relative time, the absolute time, the location information, the environment information, the parameter, and the parameter value corresponding to the parameter to a remote controller or the client. When receiving the fault number, the relative time, the absolute time, the location information, the environment information, the parameter, and the parameter value corresponding to the parameter that are sent by the vehicle-intelligent unit 120, the remote controller or the client stores the fault number, the relative time, the absolute time, the location information, the environment information, the parameter, and the parameter value corresponding to the parameter.

To distinguish which faults are already repaired and which faults are not repaired, optionally, when detecting that a fault occurs in an executor 130 connected to the subcontroller 100, at least one subcontroller 100 sets a fault flag bit of the executor 130 to a first state, where the first state is used to indicate that a fault occurs in the executor 130, and sends, to the management controller 110, the fault flag bit that is set to the first state.

When receiving the fault flag bit that is set to the first state, the management controller 110 determines that the fault flag bit is set to the first state, that is, a fault occurs in the executor 130 connected to the subcontroller 100, and sends the fault flag bit to the vehicle-intelligent unit 120. After receiving the fault flag bit, the vehicle-intelligent unit 120 stores the fault flag bit.

TABLE 2

| Fault number | Parameter | | | Relative time | Absolute time (based on a 24-hour clock) | Location information | Environment information | | | | |
|---|---|---|---|---|---|---|---|---|---|---|---|
| — | Parameter 1 | Parameter 2 | ... Parameter N | — | — | — | Temperature Celsius (° C.) | Humidity grams per cubic meter (g/m³) | Weather condition | Road condition information | Altitude kilometers (km) ... |
| Number 1 | Parameter value 1 | Parameter value 2 | ... Parameter value N | 01:00 | 10:00 May 1, 2015 | Specific location (such as the longitude and the latitude or a name of a road) | 20 | 25 | Sunny | Congestion, mountain road, or the like | 3 |

In addition, because the storage space of the vehicle-intelligent unit is limited, to store the information for a long period, the vehicle-intelligent unit sends the fault number, When the fault flag bit is stored in a form of Table 2, the fault flag bit is added based on Table 2, as shown in Table 3.

TABLE 3

| Fault flag bit | Fault number | Parameter | | | Relative time | Absolute time (based on a 24-hour clock) | Location information | Environment information | | | | |
|---|---|---|---|---|---|---|---|---|---|---|---|---|
| — | — | Parameter 1 | Parameter 2 | ... Parameter N | — | — | — | Temperature ° C. | Humidity g/m³ | Weather condition | Road condition information | Altitude km ... |
| First state | Number 1 | Parameter value 1 | Parameter value 2 | ... Parameter value N | 01:00 | 10:00 May 1, 2015 | Specific location (such as the longitude and the latitude or a name of a road) | 20 | 25 | Sunny | Congestion, mountain road, or the like | 3 |

In addition, the vehicle-intelligent unit 120 may further send the fault flag bit to the remote server or the client. After receiving the fault flag bit, the remote server or the client stores the fault flag bit.

After detecting that the fault of the executor connected to the subcontroller 100 is repaired, the subcontroller 100 sets the fault flag bit to a second state, where the second state is used to indicate that the fault of the executor 130 is already repaired, and sends, to the management controller 110, the fault flag bit that is set to the second state, when receiving the fault flag bit that is set to the second state, the management controller 110 determines a relative time at which the fault is repaired, and sends, to the vehicle-intelligent unit 120, the relative time at which the fault is repaired, the fault number, and the fault flag bit that is set to the second state, when receiving the relative time at which the fault is repaired, the fault number, and the fault flag bit that is set to the second state, the vehicle-intelligent unit 120 determines, according to the relative time at which the fault is repaired, an absolute time at which the fault is repaired, stores the relative time at which the fault is repaired, the absolute time at which the fault is repaired, the fault number, and the fault flag bit that is set to the second state, and sends, to the remote server or the client, the relative time at which the fault is repaired, the absolute time at which the fault is repaired, the fault number, and the fault flag bit that is set to the second state, and when receiving the relative time at which the fault is repaired, the absolute time at which the fault is repaired, the fault number, and the fault flag bit that is set to the second state, the remote server or the client stores the relative time at which the fault is repaired, the absolute time at which the fault is repaired, the fault number, and the fault flag bit that is set to the second state.

Further, a digit 1 may be used to indicate a first state, and a digit 0 may be used to indicate a second state. When the fault flag bit is set to 1, it indicates that a fault occurs in the executor 130, when the fault flag bit is set to 0, it indicates that the fault of the executor 130 is already repaired.

Using Table 3 as an example, after a fault with a fault number of number 1 is repaired, a manner for storing the relative time at which the fault is repaired, the absolute time at which the fault is repaired, the fault number, and the fault flag bit that is set to the second state may be shown in Table 4.

When detecting that communication between the management controller 110 and the subcontroller 100 is interrupted, the management controller 110 determines information about the communication interruption and a relative time at which the communication is interrupted, and sends the information about the communication interruption and the relative time at which the communication is interrupted to the vehicle-intelligent unit. When receiving the information about the communication interruption and the relative time at which the communication is interrupted, the vehicle-intelligent unit 120 determines, according to the relative time at which the communication is interrupted, an absolute time at which the communication is interrupted, stores the information about the communication interruption, the relative time at which the communication is interrupted, and the absolute time at which the communication is interrupted, and sends the information about the communication interruption, the relative time at which the communication is interrupted, and the absolute time at which the communication is interrupted to the remote server or the client. When receiving the information about the communication interruption, the relative time at which the communication is interrupted, and the absolute time at which the communication is interrupted, the remote server or the client stores the information about the communication interruption, the relative time at which the communication is interrupted, and the absolute time at which the communication is interrupted.

Figure 2:
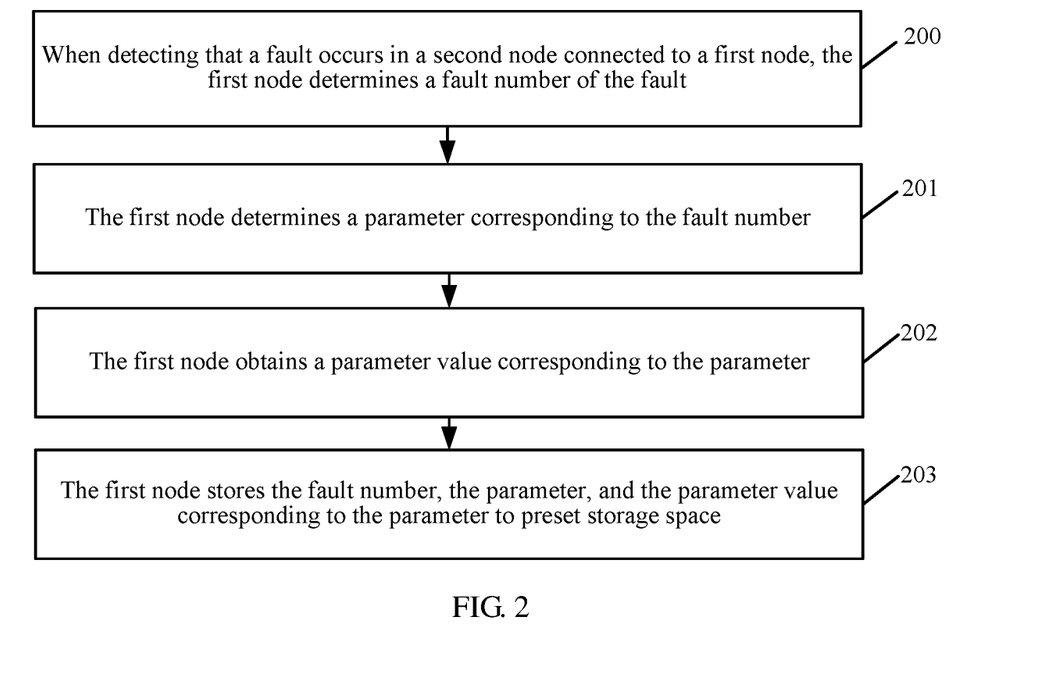
FIG. 2 is a schematic flowchart of an information storage method according to an embodiment of the present disclosure.

In this embodiment of the present disclosure, an apparatus may be further used to perform the aforementioned information storage process. Further, as shown in FIG. 2, an information storage method in this embodiment of the present disclosure includes the following steps.

Step 200: When detecting that a fault occurs in a second node connected to a first node, the first node determines a fault number of the fault.

Step 201: The first node determines a parameter corresponding to the fault number, where the parameter is a parameter for diagnosing a fault cause.

Step 202: The first node obtains a parameter value corresponding to the parameter.

Step 203: The first node stores the fault number, the parameter, and the parameter value corresponding to the parameter in preset storage space.

The preset storage space may be storage space of a storage device connected to the first node, or may be memory space of the first node.

Further, the first node may be a subcontroller or a management controller, and the second node is an executor.

TABLE 4

| Fault flag bit | Fault number | Parameter | | | Relative time | Absolute time (based on a 24-hour clock) | Location information | Enviroment information | | | | |
|---|---|---|---|---|---|---|---|---|---|---|---|---|
| — | — | Parameter 1 | Parameter 2 | ... Parameter N | — | — | — | Temperature ° C. | Humidity g/m³ | Weather condition | Road condition information | Altitude km ... |
| First state | Number 1 | Parameter value 1 | Parameter value 2 | ... Parameter value N | 01:00 | 10:00 May 1, 2015 | Specific location (such as the longitude and the latitude or a name of a road) | 20 | 25 | Sunny | Congestion, mountain road, or the like | 3 |
| the second state | Number 1 | — | — | — — | 02:00 | 11:00 May 1, 2015 | — | — | — | — | — | — — |

It should be understood that in this embodiment of the present disclosure, when the information storage system is applied to an automobile, the fault number may be a DTC trouble code or may be a predefined fault number.

Further, parameters in this embodiment of the present disclosure include, but are not limited to, an external parameter that can cause the executor to encounter a fault, an original parameter of running of the executor, an intermediate parameter, and an output parameter. For example, when the executor is a car light, the parameters may include an input voltage of the car light, a temperature of the car light, and an intermediate parameter before the temperature of the car light is obtained through calculation.

Further, a manner for obtaining a parameter value corresponding to a parameter in this embodiment of the present disclosure includes the following.

When detecting that a fault occurs in the second node, the first node buffers an operating parameter of a machine to which the second node belongs, and a parameter value corresponding to the operating parameter, and obtains, from the buffered operating parameter and the buffered parameter value corresponding to the operating parameter, a parameter value corresponding to a target parameter, where the target parameter refers to a parameter that is determined by the first node and that corresponds to the fault number.

Because the memory space of the first node is limited, optionally, after obtaining the parameter value corresponding to the parameter, the first node deletes the buffered operating parameter and the buffered parameter value corresponding to the operating parameter.

To search for information that is used to diagnose a fault and that is stored several months ago or several years ago, and to locate or restore, according to the stored information, data of a field in which a fault occurs, optionally, after detecting that a fault occurs in the second node, the first node obtains time information, location information, and environment information when the fault occurs in the second node, and stores, in preset storage space, and the time information, the location information, and the environment information when the fault occurs in the second node.

The time information of the second node is an absolute time at which the fault occurs.

It should be noted that the location information is the location information when the fault occurs, for example, a name of a road, the longitude and the latitude, or other information that can be used to determine a location, the environment information includes, but is not limited to, a temperature and humidity when the fault occurs, an altitude of the location, a weather condition (for example, it is sunny, rainy, or snowy), and road condition information (such as a congestion situation, a super highway, a country lane, or a road in a mountainous area).

In addition, in another optional manner, when detecting that a fault occurs in the second node, the first node notifies a target node to obtain and store the time information, the location information, and the environment information when the fault occurs, where the target node is a node used to obtain the time information, the location information, and the environment information.

It should be noted that generally, the target node stores the obtained time information, location information, and environment information in the preset storage space. For example, the storage space is the same as the storage space for storing the fault number, the parameter, and the parameter value corresponding to the parameter.

To store the information for a long period, the first node sends, to the remote server or the client, the fault number, the parameter, the parameter value corresponding to the parameter, and the time information, the location information, and the environment information when the fault occurs. When receiving the fault number, the parameter, the parameter value corresponding to the parameter, and the time information, the location information, and the environment information when the fault occurs, the remote server or the client stores the fault number, the parameter, the parameter value corresponding to the parameter, and the time information, the location information, and the environment information when the fault occurs.

To distinguish which faults are already repaired and which faults are not repaired, optionally, when detecting that a fault occurs in the second node, the first node sets a fault flag bit of the second node to a first state, and stores the fault flag bit that is set to the first state in the preset storage space, where the first state is used to indicate that a fault occurs in the second node.

After detecting that the fault of the second node is repaired, the first node sets the fault flag bit of the second node to a second state, where the second state is used to indicate that the fault is already repaired, and stores the fault flag bit that is set to the second state in the preset storage space.

To improve detection accuracy, optionally, after determining that a communication fault occurs in a third node connected to the first node, the first node obtains information about a time at which the communication fault occurs, and stores, in the preset storage space, information that a communication fault occurs between the first node and the third node, and the information about the time at which the communication fault occurs.

It should be noted that when the first node is a subcontroller, the third node is a management controller, when the first node is a management controller, the third node is a subcontroller.

Based on a same inventive concept, an embodiment of the present disclosure further provides an information storage apparatus. Because a method corresponding to the information storage apparatus is the information storage method in the embodiment of the present disclosure, for implementation of the information storage apparatus in this embodiment of the present disclosure, refer to implementation of the method, and repeated content is not described again.

Figure 3:
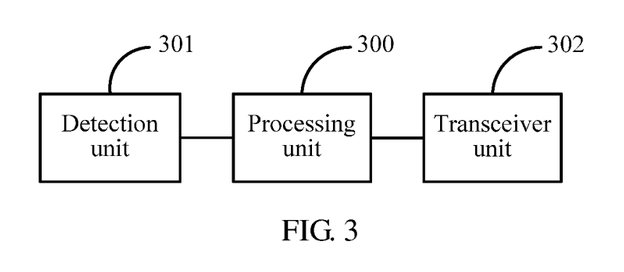
FIG. 3 is a schematic structural diagram of an information storage apparatus according to an embodiment of the present disclosure.

As shown in FIG. 3, an information storage apparatus in this embodiment of the present disclosure includes a processing unit 300 and a detection unit 301. The detection unit 301 is configured to detect whether a fault occurs in a node connected to the detection unit 301. The processing unit 300 is configured to determine a fault number of the fault when the detection unit 301 detects that a fault occurs in the node connected to the detection unit 301, determine a parameter corresponding to the fault number, where the parameter is a parameter for diagnosing a fault cause, obtain a parameter value corresponding to the parameter, and store the fault number, the parameter, and the parameter value corresponding to the parameter in preset storage space.

Optionally, when the detection unit 301 detects that a fault occurs in the node connected to the detection unit 301, the processing unit 300 buffers an operating parameter of a machine to which the node connected to the detection unit 301 belongs, and a parameter value corresponding to the operating parameter, and obtains, from the buffered operating parameter and the buffered parameter value corresponding to the operating parameter, a parameter value corresponding to a target parameter. The target parameter refers to a parameter that is determined by the processing unit 300 and that corresponds to the fault number.

Optionally, after obtaining the parameter value corresponding to the parameter, the processing unit 300 deletes the buffered operating parameter and the buffered parameter value corresponding to the operating parameter.

Optionally, after determining that a communication fault occurs in a node connected to the processing unit 300, the processing unit 300 obtains information about a time at which the communication fault occurs, and stores, in the preset storage space, information that a communication fault occurs between the node connected to the processing unit 300 and the processing unit 300, and the information about the time at which the communication fault occurs.

Optionally, when the detection unit 301 detects that a fault occurs in the node connected to the detection unit 301, the processing unit 300 sets a fault flag bit of the node connected to the detection unit 301 to a first state, where the first state is used to indicate that a fault occurs in the node connected to the detection unit 301, and stores the fault flag bit that is set to the first state in the preset storage space.

Optionally, after the detection unit 301 detects that the fault of the node connected to the detection unit 301 is repaired, the processing unit 300 sets the fault flag bit of the node connected to the detection unit 301 to a second state, where the second state is used to indicate that the fault of the node connected to the detection unit 301 is already repaired, and stores the fault flag bit that is set to the second state in the preset storage space.

Optionally, when the detection unit 301 detects that a fault occurs in the node connected to the detection unit 301, the processing unit 300 obtains time information, location information, and environment information when the fault occurs in the node connected to the detection unit 301, and stores the time information, the location information, and the environment information in the preset storage space.

Optionally, when the detection unit 301 detects that a fault occurs in the node connected to the detection unit 301, the processing unit 300 notifies a target node to obtain and store the time information, the location information, and the environment information, where the target node is a node used to obtain the time information, the location information, and the environment information.

Optionally, the apparatus further includes a transceiver unit 302, where the transceiver unit 302 sends, to a remote server or a client, the fault number, the parameter, the parameter value corresponding to the parameter, and the time information, the location information, and the environment information when the fault occurs.

Figure 4:
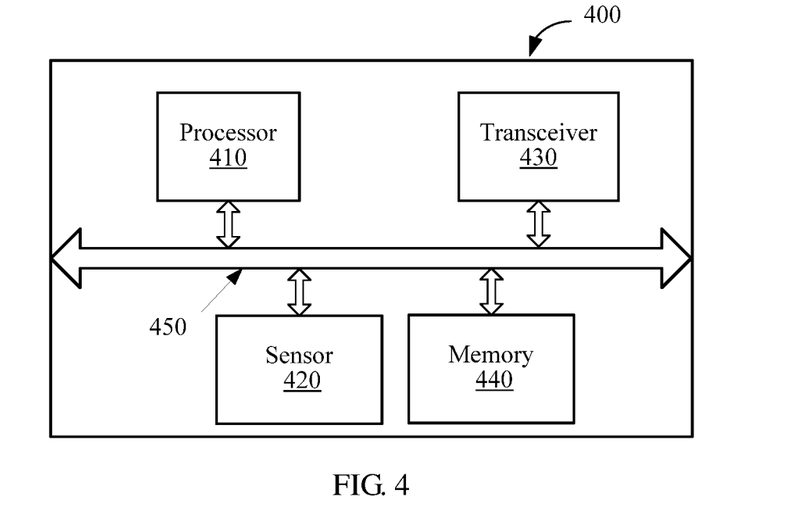
FIG. 4 is a schematic diagram of a hardware structure of an information storage apparatus according to an embodiment of the present disclosure.

It should be noted that in this embodiment of the present disclosure, the processing unit 300 may be implemented by a processor, the detection unit 301 may be implemented by a sensor, and the transceiver unit 302 may be implemented by a transceiver. As shown in FIG. 4, an information storage apparatus 400 may include a processor 410, a sensor 420, a transceiver 430, and a memory 440. The memory 440 may store code or a program preinstalled in the apparatus 400 at delivery, and may also store code executed by the processor 410.

Components in the apparatus 400 are coupled using a bus system 450. The bus system 450 further includes a power supply bus, a control bus, and a status signal bus in addition to a data bus.

The processor 410 may use a general-purpose central processing unit (CPU), a microprocessor, an application-specific integrated circuit (ASIC), or one or more integrated circuits to perform related operations to implement the technical solutions provided in this embodiment of the present disclosure.

It should be noted that although the apparatus 400 shown in FIG. 4 only shows the processor 410, the sensor 420, the transceiver 430, and the memory 440, in a specific implementation process, persons skilled in the art should understand that the apparatus 400 further includes other devices required for normal running. Meanwhile, according to specific requirements, persons skilled in the art should understand that the apparatus 400 may further include hardware devices for implementing other additional functions. In addition, persons skilled in the art should understand that the apparatus 400 may also include only devices or modules required for implementing the embodiments of the present disclosure, and does not need to include all the devices shown in FIG. 4.

Persons of ordinary skill in the art may understand that all or some of the processes of the method in the embodiments may be implemented by a computer program instructing relevant hardware. The program may be stored in a computer readable storage medium. When the program runs, the processes of the method in the embodiments can be performed. The foregoing memory medium may be a magnetic disk, an optical disc, a read-only memory (ROM), a random access memory (RAM), or the like.

It can be seen from the aforementioned content that a management controller, a vehicle-intelligent unit, and at least one subcontroller are provided, where each subcontroller of the subcontroller is connected to at least one executor, and the management controller is connected to each subcontroller of the subcontroller, the subcontroller is configured to determine a fault number of the fault and send the fault number to the management controller when detecting that a fault occurs in the executor connected to the subcontroller, the management controller is configured to search for a parameter corresponding to the fault number and feed back the found parameter to the subcontroller sending the fault number when receiving the fault number sent by the subcontroller, where the parameter is a parameter used to diagnose a fault cause, the subcontroller is configured to obtain a parameter value corresponding to the parameter, and send the parameter and the parameter value corresponding to the parameter to the management controller when receiving the parameter that is fed back by the management controller and that corresponds to the fault number, the management controller is configured to send the fault number, the parameter, and the parameter value corresponding to the parameter to the vehicle-intelligent unit when receiving the parameter and the parameter value corresponding to the parameter that are sent by the subcontroller, the vehicle-intelligent unit is configured to store the fault number, the parameter, and the parameter value corresponding to the parameter when receiving the fault number, the parameter, and the parameter value corresponding to the parameter that are sent by the management controller. In the technical solution, when a fault is detected, a parameter corresponding to the fault and a parameter value corresponding to the parameter can be stored, and for the parameter, a parameter type and a parameter quantity are not limited. Therefore, compared with the other approaches in which information used for diagnosing a fault cause is stored using a freeze frame, relatively comprehensive information can be stored.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc ROM (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. An information storage system, comprising:
at least one subcontroller; coupled to at least one executor, wherein the at least one subcontroller is configured to send a fault number of a fault when detecting that the fault occurs in the at least one executor; and
a management controller coupled to the at least one subcontroller, wherein the management controller is configured to:
recieve the fault number from the at least one suncontroller;
search for a parameter corresponding to the fault number for diagnosing a fault cause when receiving the fault number from the at least one subcontroller; and
feedback the parameter to the at least one subcontroller,
wherein the at least one subcontroller is further configured to:
obtain a first parameter value corresponding to the parameter received from the management controller; and
send the parameter and the first parameter value to the management controller,
wherein is the management controller is further configured to send the fault number, the parameter, and the first parameter value to a vehicle-intelligent device that is coupled to the management controller and the at least one subcontroller when receiving the parameter and the first parameter value from the at least one subcontroller, and
wherein the vehicle-intelligent device is configured to;
store the fault number, the parameter, and the first parameter value when receiving the fault number, the parameter, and the first parameter value from the management controller;
determine location information and environment information when the fault occurs; and
store the location information and the environment information when the fault occurs.

2. The system according to claim 1, wherein the at least one subcontroller is further configured to:
latch an operating parameter and a second parameter value corresponding to the operating parameter when detecting that the fault occurs in the at least one executor; and
obtain, from the operating parameter and the second parameter value, a third parameter value corresponding to a target parameter referring to the parameter corresponding to the fault number,
wherein the management controller is further configured to send a latch deletion command to the at least one subcontroller when receiving the parameter and the first parameter value from the at least one subcontroller, and
wherein the at least one subcontroller is further configured to delete, according to the latch deletion command, the operating parameter and the second parameter value when receiving the latch deletion command from the management controller.

3. The system according to claim 1, wherein the management controller is further configured to:
determine a relative time at which the fault occurs when receiving the parameter and the first parameter value from the at least one subcontroller; and
send the relative time to the vehicle-intelligent device, and
wherein the vehicle-intelligent device is further configured to:
determine, according to the relative time, an absolute time at which the fault occurs when receiving the relative time from the management controller; and
store the relative time at which the fault occurs and the absolute time at which the fault occurs.

4. The system according to claim 3, wherein the location information comprises longitude and latitude coordinates of a location at which the fault occurs, and wherein the environment information comprises at least one of a weather condition, a traffic condition, or a road condition at the location where the fault occurs.

5. The system according to claim 3, further comprising a remote server or a client coupled to the vehicle-intelligent device, wherein the vehicle-intelligent device is further configured to send, to the remote server or the client, the fault number, the parameter, the first parameter value, the relative time at which the fault occurs, the absolute time at which the fault occurs, and the location information and the environment information when the fault occurs, and wherein the remote server or the client is configured to store the fault number, the parameter, the first parameter value, the relative time at which the fault occurs, the absolute time at which the fault occurs, and the location information and the environment information when the fault occurs when receiving the fault number, the parameter, the first parameter value, the relative time at which the fault occurs, the absolute time at which the fault occurs, and the location information and the environment information when the fault occurs.

6. The system according to claim 3, wherein the vehicle-intelligent device is further configured to send a time synchronization flag bit to the management controller, and wherein the management controller further is configured to adjust the relative time according to the time synchronization flag bit when receiving the time synchronization flag bit.

7. The system according to claim 1, wherein the at least one subcontroller is further configured to:
set a fault flag bit of the at least one executor to a first state indicating that the fault occurs in the at least one executor when detecting that the fault occurs; and
send, to the management controller, the fault flag bit that is set to the first state, and
wherein the management controller is further configured to determine that the fault flag bit is set to the first state when receiving the fault flag bit.

8. The system according to claim 7, wherein the at least one subcontroller is further configured to:
set the fault flag bit of to a second state indicating that the fault of the at least one executor is already repaired when detecting that the fault is repaired; and
send, to the management controller, the fault flag bit that is set to the second state,
wherein the management controller is further configured to:
determine a relative time at which the fault is repaired when receiving the fault flag bit that is set to the second state; and
send, to the vehicle-intelligent device, the relative time at which the fault is repaired, the fault number, and the fault flag bit that is set to the second state,
wherein the vehicle-intelligent device is further configured to:
determine, according to the relative time at which the fault is repaired, an absolute time at which the fault is repaired when receiving the relative time at which the fault is repaired, the fault number, and the fault flag bit that is set to the second state;
store the relative time at which the fault is repaired, the absolute time at which the fault is repaired, the fault number, and the fault flag bit that is set to the second state; and
send, to a remote server or a client that is coupled to the vehicle-intelligent device, the relative time at which the fault is repaired, the absolute time at which the fault is repaired, the fault number, and the fault flag bit that is set to the second state, and
wherein the remote server or the client is configured to store the relative time at which the fault is repaired, the absolute time at which the fault is repaired, the fault number, and the fault flag bit that is set to the second state when receiving the relative time at which the fault is repaired, the absolute time at which the fault is repaired, the fault number, and the fault flag bit that is set to the second state.

9. The system according to claim 1, wherein the management controller is further configured to:
determine information about communication interruption and a relative time at which a communication between the management controller and the at least one subcontroller is interrupted when detecting that the communication is interrupted; and
send the information about the communication interruption and the relative time at which the communication is interrupted to the vehicle-intelligent device,
wherein the vehicle-intelligent device is further configured to:
determine, according to the relative time at which the communication is interrupted, an absolute time at which the communication is interrupted when receiving the information about the communication interruption and the relative time at which the communication is interrupted;
store the information about the communication interruption, the relative time at which the communication is interrupted, and the absolute time at which the communication is interrupted; and
send the information about the communication interruption, the relative time at which the communication is interrupted, and the absolute time at which the communication is interrupted to a remote server that is coupled to the vehicle-intelligent device, and
wherein the remote server is configured to store the information about the communication interruption, the relative time at which the communication is interrupted, and the absolute time at which the communication is interrupted when receiving the information about the communication interruption, the relative time at which the communication is interrupted, and the absolute time at which the communication is interrupted.

10. The system according to claim 1, wherein the management controller is further configured to:
determine information about communication interruption and a relative time at which a communication between the management controller and the at least one subcontroller is interrupted when detecting that the communication is interrupted; and
send the information about the communication interruption and the relative time at which the communication is interrupted to the vehicle-intelligent device,
wherein the vehicle-intelligent device is further configured to:
determine, according to the relative time at which the communication is interrupted, an absolute time at which the communication is interrupted when receiving the information about the communication interruption and the relative time at which the communication is interrupted;
store the information about the communication interruption, the relative time at which the communication is interrupted, and the absolute time at which the communication is interrupted; and
send the information about the communication interruption, the relative time at which the communication is interrupted, and the absolute time at which the communication is interrupted to a client that is coupled to the vehicle-intelligent device, and wherein the client is configured to store the information about the communication interruption, the relative time at which the communication is interrupted, and the absolute time at which the communication is interrupted when receiving the information about the communication interruption, the relative time at which the communication is interrupted, and the absolute time at which the communication is interrupted.

11. An information storage apparatus, comprising:
a sensor configured to detect whether a fault occurs in a node coupled to the sensor; and
a processor coupled to the sensor and configured to:
determine a fault number of the fault when the sensor detects that the fault occurs in the node coupled to the sensor;
determine a parameter corresponding to the fault number for diagnosing a fault cause;
obtain a first parameter value corresponding to the parameter;
store the fault number, the parameter, and the first parameter value in preset storage space;
obtain location information and environment information when the fault occurs in the node coupled to the sensor; and
store the location information and the environment information in the preset storage space.

12. The apparatus according to claim 11, wherein the processor is further configured to:
buffer an operating parameter of a machine to which the node coupled to the sensor belongs and a second parameter value corresponding to the operating parameter when the fault occurs in the node coupled to the sensor; and
obtain, from the operating parameter and the second parameter value, a third parameter value corresponding to a target parameter corresponding to the fault number determined by the processor.

13. The apparatus according to claim 12, wherein the processor is further configured to delete the operating parameter and the second parameter value after obtaining the third parameter value corresponding to the target parameter.

14. The apparatus according to claim 11, wherein the processor is further configured to:
obtain information about a time at which a communication fault occurs after determining that the communication fault occurs in a second node coupled to the processor;
store, in the present storage space, the information about the time and second information indicating that the communication fault occurs between the second node.

15. The apparatus according to claim 11, wherein the processor is further configured to:
set a fault flag bit of the node coupled to the sensor to a first state indicating that the fault occurs in the node when the sensor detects that the fault occurs in the node coupled to the sensor; and
store the fault flag bit that is set to the first state in the preset storage space.

16. The apparatus according to claim 15, wherein the processor is further configured to:
set the fault flag bit of the node coupled to the sensor to a second state indicating that the fault of the node coupled to the sensor is already repaired after the sensor detects that the fault of the node coupled to the sensor is repaired; and
store the fault flag bit that is set to the second state in the preset storage space.

17. The apparatus according to claim 11, wherein the processor is further configured to:
obtain time information, when the sensor detects that the fault occurs in the node coupled to the sensor; and
store the time information, in the preset storage space.

18. The apparatus according to claim 17, wherein the processor is further configured to notify a target node obtaining the time information, the location information, and the environment information to obtain and store the time information, the location information, and the environment information when the sensor detects that the fault occurs in the node coupled to the sensor.

19. The apparatus according to claim 17, further comprising a transceiver coupled to the sensor and the processor and configured to send, to a remote server coupled to the apparatus, the fault number, the parameter, the first parameter value, the time information, the location information, and the environment information to be stored by the remote server.

20. The apparatus according to claim 17, further comprising a transceiver coupled to the sensor and the processor and configured to send, to a client coupled to the apparatus, the fault number, the parameter, the first parameter value, the time information, the location information, and the environment information to be stored by the client.

* * * * *

UNITED STATES PATENT AND TRADEMARK OFFICE
CERTIFICATE OF CORRECTION

PATENT NO. : 10,809,709 B2
APPLICATION NO. : 15/991813
DATED : October 20, 2020
INVENTOR(S) : Mingming Zhang, Jianfeng Zheng and Chenwang Yang

It is certified that error appears in the above-identified patent and that said Letters Patent is hereby corrected as shown below:

In the Claims

Claim 1, Column 17, Line 63 and 64: "one suncontroller;" should read "one subcontroller;"

Claim 1, Column 18, Line 16: "is configured to;" should read "is configured to:"

Signed and Sealed this
Seventeenth Day of November, 2020

Andrei Iancu
*Director of the United States Patent and Trademark Office*